UNITED STATES PATENT OFFICE.

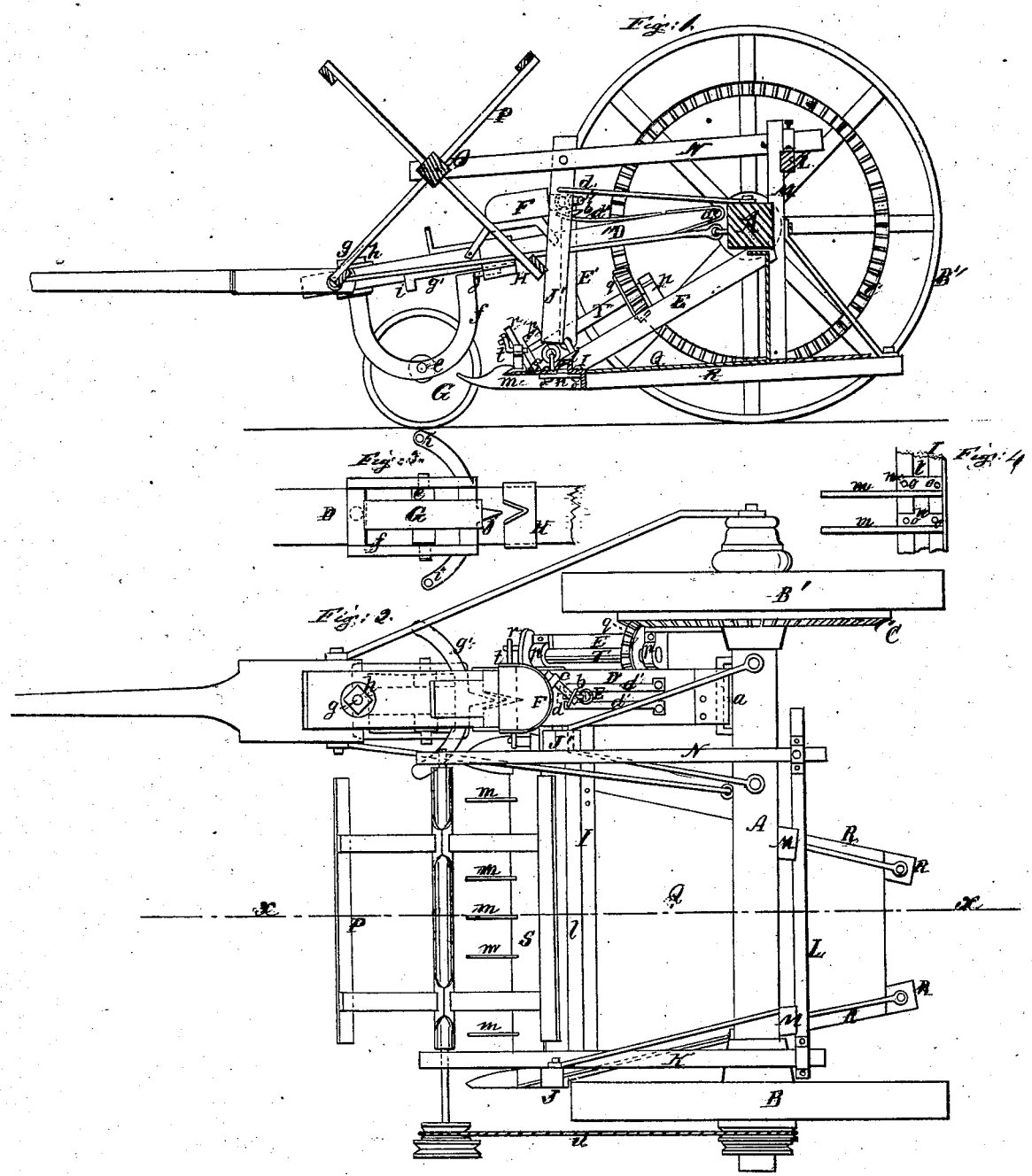
Sherman and Lightcap
Mower.
No. 17942 — Patented Aug. 4, 1857.

N. C. SHERMAN AND S. LIGHTCAP, OF HAZLE GREEN, WISCONSIN.

IMPROVEMENT IN HARVESTERS.

Specification forming part of Letters Patent No. 17,942, dated August 4, 1857.

*To all whom it may concern:*

Be it known that we, N. C. SHERMAN and S. LIGHTCAP, of Hazle Green, in the county of Grant and State of Wisconsin, have invented certain new and useful Improvements in Harvesters; and we do hereby declare that the following is a full, clear, and exact description of the same, reference being had to the annexed drawings, making a part of this specification, in which—

Figure 1 is a longitudinal vertical section of our improvement, *x x*, Fig. 2, indicating the plane of section. Fig. 2 is a plan or top view of same. Fig. 3 is a detached inverted plan of the swivel-wheel, showing the manner in which it is attached to the machine, and the means whereby it is adjusted and secured in desired positions. Fig. 4 is an inverted plan of a portion of the finger-bar with the fingers attached.

Similar letters of reference indicate corresponding parts in the several figures.

This invention consists in the combination of a peculiarly-formed adjustable collar with the caster-frame in such a manner that the caster-wheel may be, at the pleasure of the driver, held rigid in line parallel with the driving-wheels, or released, so as to turn in the ordinary manner.

To enable those skilled in the art to fully understand and construct our invention, we will proceed to describe it.

A represents an axle, and B B' represent the wheels placed on its ends, B' being the driving-wheel, and having a toothed or geared rim, C, attached to its inner side.

D represents a bar, the inner end of which is connected by a hinge or joint, *a*, to the axle A and near the driving-wheel B'.

E represents an inclined bar, the upper end of which is permanently attached to the under side of the axle A and directly underneath the bar D. The bar E inclines downward toward the front of the machine at an angle of about thirty degrees, and a vertical bar, E', is attached to the outer part of the bar D, the bar E' extending upward through a slot in the bar D, and having rings *b b* fitted in at suitable distances apart. Two rings are shown in the drawings, but more may be employed, if desired.

F represents the driver's seat, which is secured to the bar D, and a socket, *c*, is attached to the back part of the seat F, said socket having a pin, *d*, fitted in it, the pin also passing through one of the rings *b*.

To the upper surface of the bar D two springs, *d' d'*, are attached, said springs bearing against the under side of the lower ring, *b*.

To the front end of the bar D a swivel-wheel, G, is attached. The axis *e* of this wheel is fitted in a semicircular frame, *f*, one end of which is provided with a pintle, *g*, which passes vertically through the bar D, and has a nut, *h*, on its upper end. The opposite end of the frame *f*, provided with a V-shaped projection, *j*, bears or works against a semicircular plate, *g'*, which is attached to the under side of the bar D, and has a lug or projection, *i*, at each end. On the bar D a sliding collar, H, is placed, the under side of which is provided with a V-shaped notch. (See Fig. 3.)

The axle A and bar D may be constructed of wood; but the frame *f* of the swivel-wheel, as well as the plate *g* and collar H, should be constructed of metal.

I represents the finger-bar, one end of which is attached to the lower and front end of the inclined bar E. The opposite end of the finger-bar is attached to the lower end of an upright, J, the upper end of which is secured to a horizontal bar, K. The back end of the bar K is secured to a bar, L, the bar L being attached to the upper ends of two uprights, M M, which are permanently secured to the back side of the axle A, the uprights extending both above and below the axle. To the opposite end of the bar L a bar, N, is secured, the bar N being precisely similar to the bar K, and secured to an upright, J'. In the front end of the bars K N the shaft O of the reel P is fitted and works.

Q represents the platform, which is attached to horizontal bars R, which are secured to the lower ends of the uprights M M and to the under side of the finger-bar I. The bars R extend back of the uprights sufficiently far to allow a platform to be attached to form a stand for the raker or attendant who rakes the cut grain from the platform. The finger-bar I is formed of a strip of metal plate, which is bent or swaged so as to form a longitudinal fold, *l*, the front surface of which is of rounded form and the back part vertical, as shown clearly in Fig. 1.

The fingers m are formed each with a flange, n, at their back parts, as shown clearly in Fig. 4, and the fingers are secured to the under side of the finger-bar by bolts or rivets o, which pass through the finger-bar and flanges. The cutter-bar S works on the fingers m in the usual way. (See Fig. 1.)

T is a shaft, which works in bearings p on the bar E. The upper end of this shaft has a pinion, q, upon it, which pinion gears into the geared rim C. The lower end of the shaft T has a crank-pulley, r, upon it, and the cutter-bar S is driven from the crank-pulley r by a connecting-rod, t.

The reel P is driven by a belt, u, from the hub of the wheel B.

From the above description of parts it will be seen that the finger-bar may be adjusted the desired height from the ground by inserting the pin d in the proper ring b in the bar E'. The springs d' allow the finger-bar to yield or give to the irregularities of the ground. Thus it will be seen that the finger-bar and cutter may be readily adjusted the desired height from the surface of the ground and a requisite degree of elasticity allowed the cutter-bar.

By constructing the finger-bar as shown great strength, with a moderate weight of metal, is obtained, and the bolting of the fingers m to the bar serves to increase its strength.

By the combination of the peculiarly-formed adjustable collar H with the caster-frame f, in the manner described, not only does the wheel G serve all the ordinary functions of a common caster-wheel, but it also prevents the side draft when the machine is in operation. The prevention of the side draft is obtained by throwing the collar H forward, so that it shall lock the caster-frame f and hold the wheel G rigidly in line parallel with the driving-wheels, and when thus held rigid the tendency of the machine to swing around, thus producing side draft, is prevented. When the wheel G is thus locked the machine is also guided in a straight line over the ground and cannot readily wiggle or sway in a zigzag manner. By throwing back the collar H the wheel G is left loose and turns upon its axis in the usual manner, thus permitting the machine easily to turn around or be changed in its line of movement. The upper surface of the collar H, it will be observed, extends along the top of bar B for a short distance, and is bent up so as form a projection or catch, H', at a convenient distance from the driver's seat F. The driver locks or unlocks wheel G by merely pushing or pulling the catch H' with his foot.

Having thus described our invention, what we claim as new, and desire to secure by Letters Patent, is—

The combination of the peculiarly-formed adjustable collar H with the caster-frame f in the manner described, whereby the caster-wheel may be, at the pleasure of the driver, held rigid in line parallel with the driving-wheels, or released, so as to turn in the ordinary manner.

N. C. SHERMAN.
S. LIGHTCAP.

Witnesses:
JOSEPH MASON,
BYRON R. SHERMAN.